(No Model.)

J. F. BYRNES.
MECHANICAL HORSE FOR STAGE SCENERY.

No. 437,015. Patented Sept. 23, 1890.

WITNESSES:
Edward Wolff
William Miller

INVENTOR:
John F. Byrnes.
BY
Van Santvoord & Hauff
his ATTORNEYS

UNITED STATES PATENT OFFICE.

JOHN F. BYRNES, OF NORWICH, CONNECTICUT.

MECHANICAL HORSE FOR STAGE-SCENERY.

SPECIFICATION forming part of Letters Patent No. 437,015, dated September 23, 1890.

Application filed May 16, 1890. Serial No. 351,994. (No model.)

*To all whom it may concern:*

Be it known that I, JOHN F. BYRNES, a citizen of the United States, residing at Norwich, in the county of New London and State of Connecticut, have invented new and useful Improvements in Mechanical Horses for Stage-Scenery, of which the following is a specification.

This invention consists in the figure of a horse or other animal having a separable body and a reversible head. The two body-sections are connected by a detachable flexible tube, so that the body of the animal can be drawn out to an extraordinary length.

This invention is illustrated in the accompanying drawings, in which—

Figure 1:
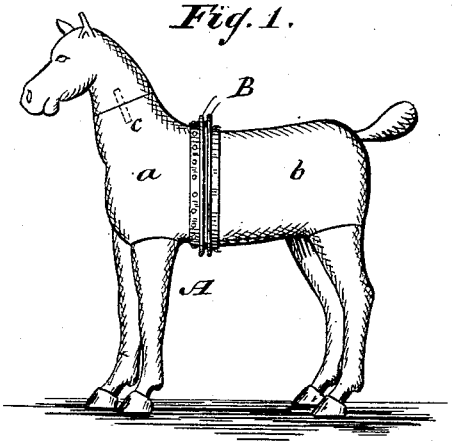
Figure 2:
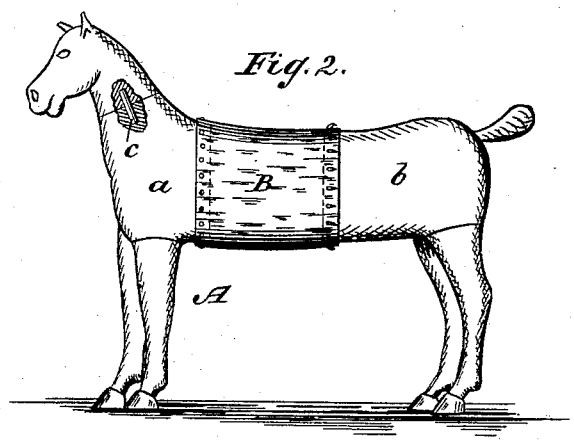
Figure 3:
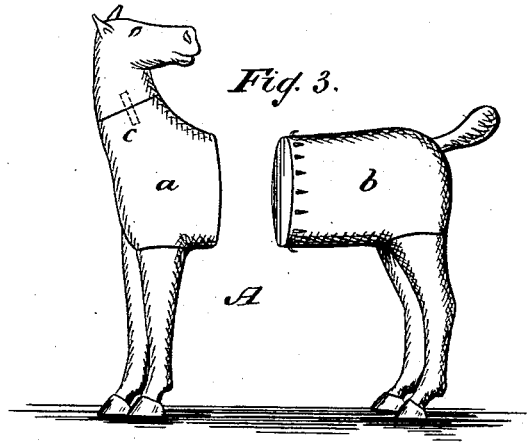

Figure 1 represents an elevation of the figure of a horse in its natural position. Fig. 2 is a similar view when the body of the horse is elongated beyond its natural proportion. Fig. 3 is a similar view showing the two body-sections separated one from the other and the head turned backward.

In the drawings, the letter A designates the figure of an animal—such as a horse—the body of which is made in two sections $a$ $b$, which are connected to each other by a flexible tube B, so that the rear section $b$ of the body can move close up to the front section $a$, as shown in Fig. 1, or that the body can be elongated beyond its natural proportion, as shown in Fig. 2. The flexible tube B is attached to the body-sections by suitable fastenings of such a nature that said tube can be readily detached.

The head C is connected to the body A by a pivot $c$ or otherwise, so that it can be turned to the position shown in Figs. 1 and 2, or that it can be reversed, as shown in Fig. 3. If the tube B is detached from the body-sections $a$ $b$, the rear section $b$ can be moved away from the front section, and by turning the head C to the position shown in Fig. 3 the horse appears to look back with amazement after the disappearing rear section of its body.

What I claim as new, and desire to secure by Letters Patent, is—

A mechanical horse or like animal for stage-scenery, having a rotary head and divided vertically between its two pairs of legs into two sections connected by a flexible tube to enable the rear section to be withdrawn horizontally with the hind legs on the floor while the head of the animal is turned rearward, substantially as and for the purposes described.

In testimony whereof I have hereunto set my hand in the presence of two subscribing witnesses.

JOHN F. BYRNES.

Witnesses:
 J. VAN SANTVOORD,
 E. F. KASTENHUBER.